United States Patent
Huang et al.

(10) Patent No.: US 10,534,985 B2
(45) Date of Patent: Jan. 14, 2020

(54) METHOD FOR RECOGNIZING LICENSE PLATE IN VEHICLE CAMERA DEVICE AND VEHICLE CAMERA DEVICE

(71) Applicant: GETAC TECHNOLOGY CORPORATION, Hsinchu County (TW)

(72) Inventors: Cheng-Liang Huang, Taipei (TW); Yung-Le Hung, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 78 days.

(21) Appl. No.: 15/913,859

(22) Filed: Mar. 6, 2018

(65) Prior Publication Data

US 2019/0114516 A1   Apr. 18, 2019

(30) Foreign Application Priority Data

Oct. 13, 2017   (CN) .......................... 2017 1 0950150

(51) Int. Cl.
*G06K 9/78* (2006.01)
*G06K 9/00* (2006.01)
*G08G 1/017* (2006.01)
*G08G 1/052* (2006.01)
*G06K 9/32* (2006.01)

(52) U.S. Cl.
CPC ........... *G06K 9/78* (2013.01); *G06K 9/00791* (2013.01); *G06K 9/32* (2013.01); *G06K 9/3258* (2013.01); *G08G 1/0175* (2013.01); *G08G 1/052* (2013.01); *G06K 2209/15* (2013.01)

(58) Field of Classification Search
CPC .......... G06K 9/78; G06K 9/32; G06K 9/3258; G06K 9/00791; G06K 2209/15; G08G 1/0175; G08G 1/052
See application file for complete search history.

(56) References Cited

U.S. PATENT DOCUMENTS

2014/0362231 A1* 12/2014 Bietsch ...................... G06T 7/20
                                                                  348/169

* cited by examiner

*Primary Examiner* — Leon Flores

(57) ABSTRACT

A vehicle camera device is applied in a vehicle. The vehicle camera device performs image recognition of current driving image to obtain a license-plate pattern in the driving image, and when size of the license-plate pattern is less than a threshold, increases a focus according to current speed of the vehicle.

9 Claims, 8 Drawing Sheets

METHOD FOR RECOGNIZING LICENSE PLATE IN VEHICLE CAMERA DEVICE AND VEHICLE CAMERA DEVICE

CROSS REFERENCE TO RELATED APPLICATIONS

This Application claims priority of China Patent Application No. 201710950150.2 filed on Oct. 13, 2017, the entirety of which is incorporated by reference herein.

BACKGROUND OF THE INVENTION

Field of the Invention

The present invention relates to event data recorders and, more particularly, to a method for recognizing a license plate with a vehicle camera device and the vehicle camera device.

Description of the Prior Art

Vehicles are regarded as a means of transport indispensable to every society nowadays. Vehicles are on the rise, so are traffic accident disputes. Safe driving on diverse, unpredictable roads necessitates different safety devices mounted on vehicles. The safety devices fall within two categories: active auxiliary driving devices and vehicle camera devices. The former detects distances between vehicles and generates an alert which warns drivers of overly short distances. The latter, for example, an event data recorder, passively records how vehicles are moving.

In case of a traffic accident dispute, liability investigation will be based on images captured by roadside picture-taking devices, images captured by an event data recorder mounted on every vehicle involved in the accident, and/or images captured by an event data recorder mounted on every vehicle passing the scene of the traffic accident at the point in time when the traffic accident happens. To identify the vehicle(s) held accountable for the traffic accident, some event data recorders are even capable of license plate recognition. However, images captured by the event data recorders are unclear because of the motion of the vehicles; hence, genuineness of license plate numbers thus recognized is in doubt.

SUMMARY OF THE INVENTION

In an embodiment, a method for recognizing a license plate with a vehicle camera device is provided and adapted for use with a vehicle. The method comprises the steps of: capturing a first driving image by a picture-taking module with a focal length of a first assigned value; performing image recognition on the first driving image to search the first driving image for a license-plate picture; detecting a picture size of the license-plate picture according to a size threshold; increasing the focal length from the first assigned value to a second assigned value according to a speed of the vehicle when the picture size of the license-plate picture is smaller than the size threshold; and capturing a second driving image by the picture-taking module with the focal length of the second assigned value.

In another embodiment, a vehicle camera device is provided and adapted to be disposed on a vehicle. The vehicle camera device comprises a picture-taking module, an image analyzing unit, an adjusting unit and a determining unit. The picture-taking module captures a driving image with a focal length. The image analyzing unit performs image recognition on the driving image to search the driving image for a license-plate picture. The adjusting unit receives a speed of the vehicle. The determining unit detects a picture size of the license-plate picture according to a size threshold and causes the adjusting unit to increase the focal length of the picture-taking module according to the speed of the vehicle when the picture size of the license-plate picture is smaller than the size threshold.

In yet another embodiment, a method for recognizing a license plate with a vehicle camera device comprises: assigning an input value which is a function of the speed of the vehicle to a focal length of the picture-taking module, capturing a driving image by the picture-taking module with the focal length assigned, searching the driving image for a license-plate picture, and recognizing the license-plate picture found.

In conclusion, a method for recognizing a license plate with a vehicle camera device and the vehicle camera device according to the present invention are adapted for use with a vehicle. The focal length of the vehicle camera device is adjusted in response to the speed of the vehicle to increase the recognition rate of a license-plate picture found in a driving image captured with the vehicle camera device.

DETAILED DESCRIPTION OF THE EMBODIMENTS

Figure 1:
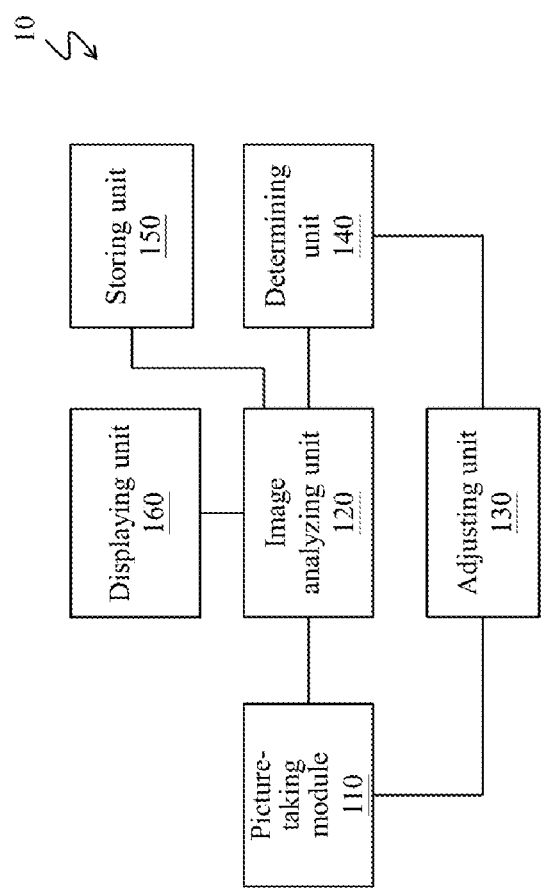
FIG. 1 is a block diagram of a vehicle camera device according to an embodiment of the present invention.
Figure 2:
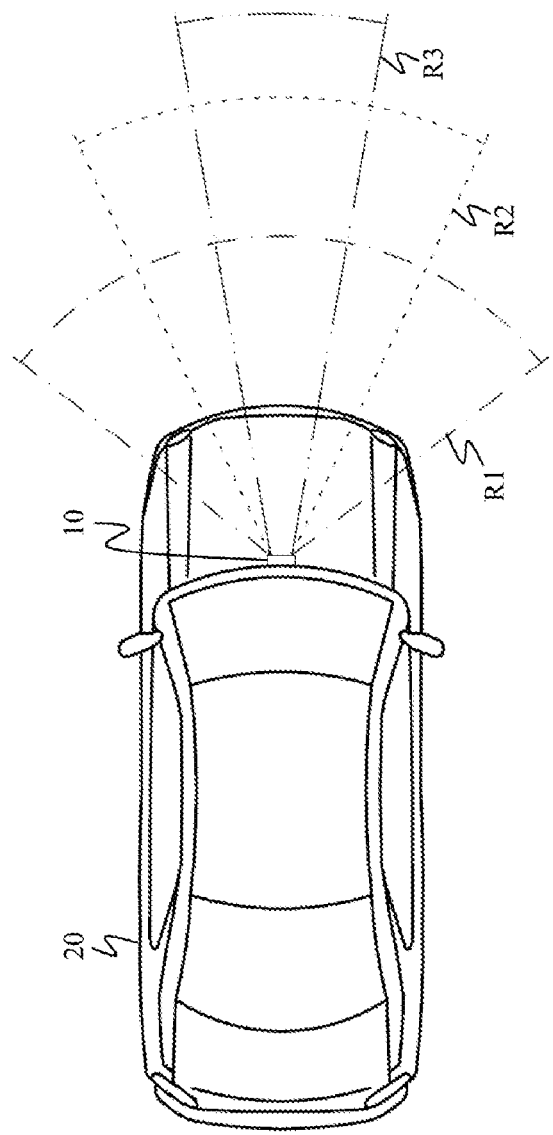
FIG. 2 is a schematic view of implementation of the vehicle camera device of FIG. 1.

FIG. 1 is a block diagram of a vehicle camera device according to an embodiment of the present invention. FIG. 2 is a schematic view of implementation of the vehicle camera device of FIG. 1.

Referring to FIG. 1 and FIG. 2, a vehicle camera device 10 is adapted to be disposed on a vehicle 20. In some embodiments, the vehicle camera device 10 is mounted on the vehicle 20 and faces in the direction in which the vehicle 20 moves forward to take pictures.

The vehicle camera device 10 comprises a picture-taking module 110, an image analyzing unit 120, an adjusting unit 130 and a determining unit 140. The image analyzing unit 120 is connected between the picture-taking module 110 and the determining unit 140. The adjusting unit 130 is connected between the picture-taking module 110 and the determining unit 140.

The picture-taking module 110 keeps capturing a driving image with a focal length while the vehicle 20 is moving. Each time when the picture-taking module 110 captures a driving image, the image analyzing unit 120 performs image recognition on the currently-captured driving image to search the driving image for a license-plate picture. The determining unit 140 detects the picture size of the found license-plate picture according to a size threshold. If the picture size of the license-plate picture found is smaller than the size threshold, the determining unit 140 causes the adjusting unit 130 to adjust the focal length of the picture-taking module 110. To adjust the focal length, the adjusting unit 130 receives the speed of the vehicle 20 and increases the focal length of the picture-taking module 110 according to the speed of the vehicle 20.

To clearly describe related components, the words "first," "second" and "third" used below are intended to distinguish the components rather than sort or define their differences, but the present invention is not limited thereto.

Figure 3:
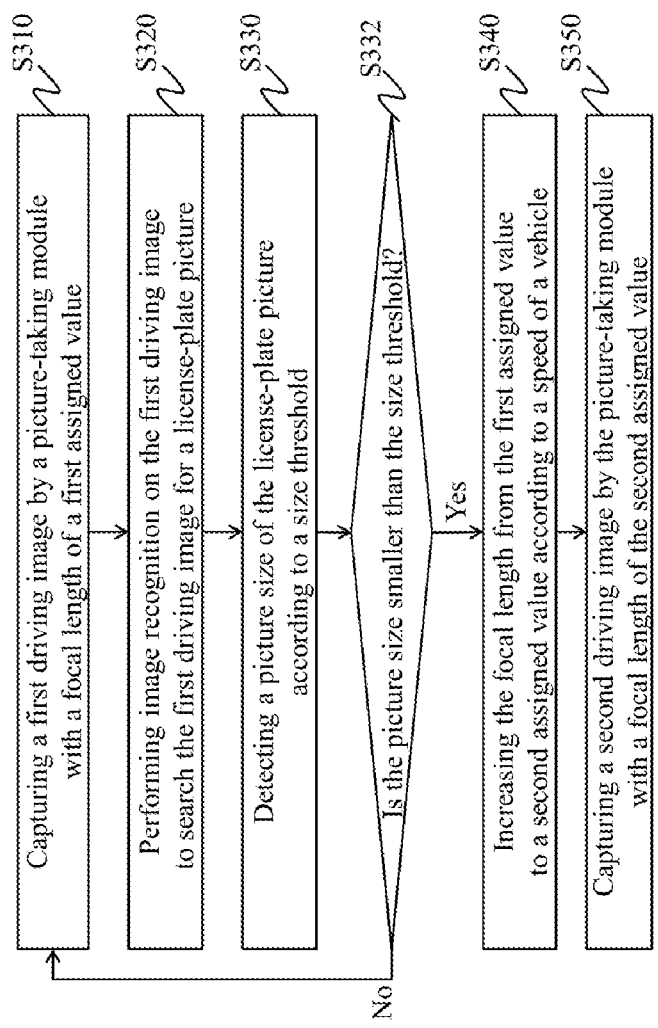
FIG. 3 is a flowchart of a method for recognizing a license plate with a vehicle camera device according to the first embodiment of the present invention.
Figure 4:
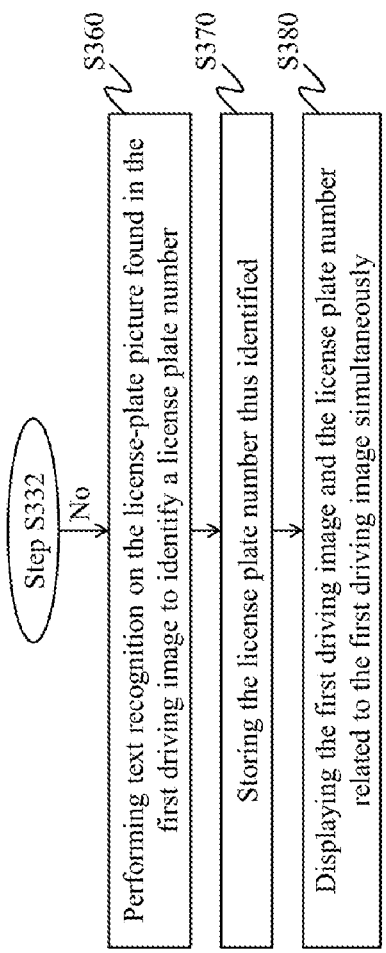
FIG. 4 is a partial flowchart of a method for recognizing a license plate with a vehicle camera device according to the second embodiment of the present invention.
Figure 5:
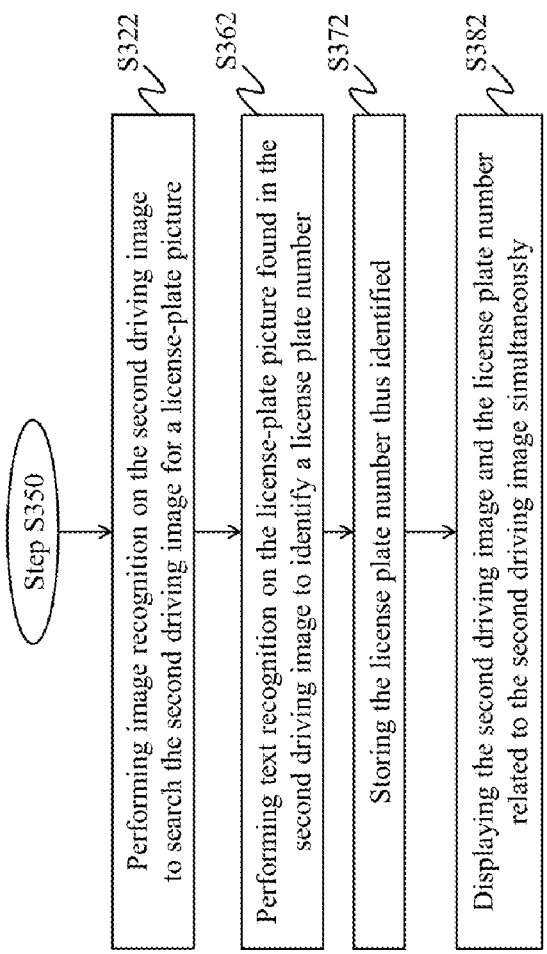
FIG. 5 is a partial flowchart of a method for recognizing a license plate with a vehicle camera device according to the third embodiment of the present invention.
Figure 6:
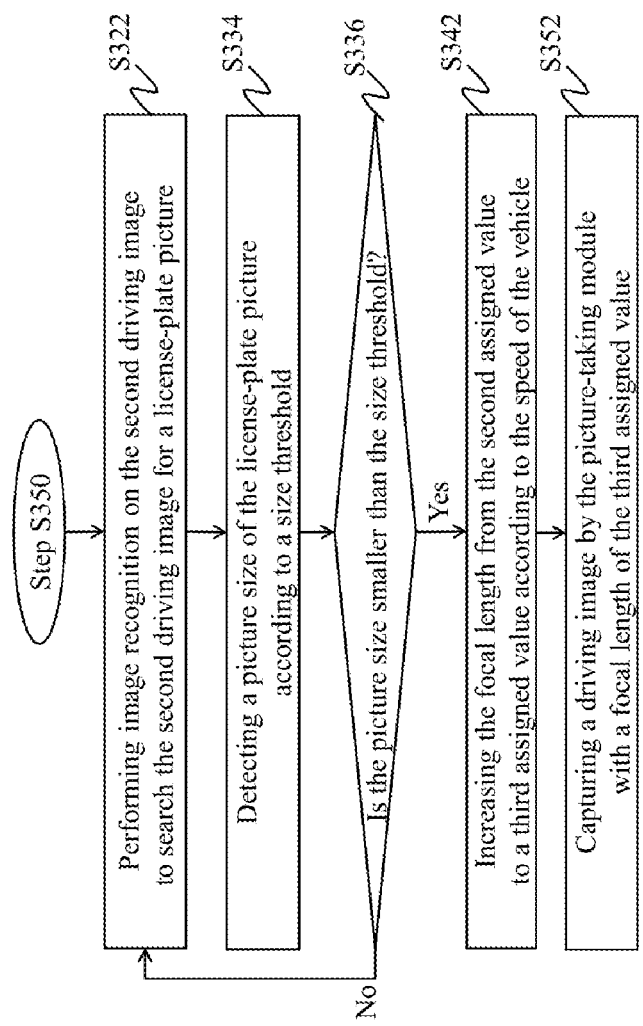
FIG. 6 is a partial flowchart of a method for recognizing a license plate with a vehicle camera device according to the fourth embodiment of the present invention.

Referring to FIGS. 1-3, at the first point in time, the picture-taking module 110 captures a driving image (hereinafter referred to as the first driving image) with a focal length of a first assigned value (step S310). The picture-taking module 110 captures an image in focus around a first picture-taking range R1 to obtain the first driving image.

The image analyzing unit 120 performs image recognition on the first driving image to search the first driving image for the license-plate picture (step S320). The determining unit 140 detects the picture size of the license-plate picture according to a size threshold (step S330) to determine whether the picture size of the license-plate picture is smaller than the size threshold (step S332).

If the picture size of the license-plate picture is smaller than the size threshold, the determining unit 140 causes the adjusting unit 130 to increase the focal length from the first assigned value to a second assigned value according to the speed of the vehicle 20 (step S340). Afterward, at the second point in time, the picture-taking module 110 keeps capturing a driving image (hereinafter referred to as the second driving image) with the focal length of the second assigned value (step S350). At this point in time, the picture-taking module 110 captures an image in focus around a second picture-taking range R2 to obtain the second driving image.

When the picture size of the license-plate picture is larger than or equal to the size threshold, the adjusting unit 130 does not change the focal length of the picture-taking module 110 such that the picture-taking module 110 keeps capturing a driving image with the focal length of the first assigned value (that is, going back to step S310).

In some embodiments of step S340, the adjusting unit 130 generates the second assigned value according to an input value which is a function of the speed of the vehicle 20, assigns the focal length of the picture-taking module 110 with the second assigned value thus generated, and causes the picture-taking module 110 to keep capturing a driving image with the focal length of the second assigned value.

In an embodiment, the vehicle camera device 10 comprises a storing unit 150. The storing unit 150 is connected to the image analyzing unit 120.

Referring to FIGS. 1-4, when the picture size of the license-plate picture is larger than or equal to the size threshold, the determining unit 140 causes the image analyzing unit 120 to perform text recognition on the license-plate picture found in the first driving image so as to identify a license plate number (step S360) and store the identified license plate number in the storing unit 150 (step S370).

In an embodiment, the vehicle camera device 10 comprises a displaying unit 160. The displaying unit 160 is connected to the image analyzing unit 120. After the license plate number has been identified (step S360), the displaying unit 160 displays the current first driving image and the license plate number related to the first driving image simultaneously (step S380). In some embodiments of step S380, the image analyzing unit 120 composites a composite image by combining the license plate number and the first driving image, and then the displaying unit 160 displays the composite image which comprises the first driving image and the license plate number.

Referring to FIGS. 1-3 and 5, in some embodiments, after step S350, the image analyzing unit 120 performs image recognition on the second driving image to search the second driving image for a license-plate picture (step S322). After the license-plate picture has been found in the second driving image (step S322), the image analyzing unit 120 performs text recognition on the license-plate picture found in the second driving image, so as to identify a license plate number (step S362) and store the license plate number in the storing unit 150 (step S372).

In an embodiment, after the license plate number has been identified (step S362), the displaying unit 160 displays the current second driving image and the license plate number related to the second driving image simultaneously (step S382). In some embodiments of step S382, the image analyzing unit 120 composites a composite image by combining the license plate number and the second driving image, and then the displaying unit 160 displays the composite image which comprises the second driving image and the license plate number.

Referring to FIGS. 1-3 and 6, in an embodiment, after step S350, the image analyzing unit 120 performs image recognition on the second driving image to search the second driving image for the license-plate picture (step S322). The determining unit 140 detects the picture size of the found license-plate picture according to a size threshold (step S334) and determines whether the picture size of the license-plate picture is smaller than the size threshold (step S336). If the license-plate picture is smaller than the size threshold, the determining unit 140 causes the adjusting unit 130 to increase the focal length from the second assigned value to a third assigned value according to the speed of the vehicle 20 (step S342). Afterward, at the third point in time, the picture-taking module 110 keeps capturing a driving image with a focal length of the third assigned value (step S352). At this point in time, the picture-taking module 110 captures an image in focus around a third picture-taking range R3 to obtain a driving image.

Therefore, in this embodiment, the vehicle camera device 10 captures a driving image consecutively and repeatedly (step S310, S350 or S352), searches the driving image for a license-plate picture (step S320 or S322), detects the picture size of the license-plate picture according to the size threshold (step S330 or S332), increases the focal length of the picture-taking module 110 according to the speed of the vehicle when the picture size is smaller than the size threshold (step S340 or S342), and performs text recognition on the current license-plate picture until the picture size is not smaller than the size threshold or the focal length of the picture-taking module is maximized so as to identify a license plate number (step S360). In other words, the vehicle camera device 10 will perform text recognition if the second assigned value is equivalent to the preceding first assigned value, or the third assigned value is equivalent to the preceding second assigned value.

In some embodiments, the focal length is changed by optical zoom or digital zoom. In some embodiments, the first assigned value, second assigned value and third assigned value are each an optical zoom multiple, such as 1×, 1.5×, 2×, 2.5×, 3×, 3.5× or a larger multiple. The first assigned value is not larger than the second assigned value, whereas the second assigned value is not larger than the third assigned value.

In some embodiments, the size threshold is assigned and stored in the storing unit 150 in advance. The size threshold includes a width threshold and a height threshold. If the width of the picture size of the license-plate picture is smaller than the width threshold or the height of the picture size of the license-plate picture is smaller than the height threshold, the determining unit 140 determines that the license-plate picture is smaller than the size threshold. The width threshold is 100 pixels, 150 pixels, or 200 pixels. The height threshold is 50 pixels, 75 pixels, or 100 pixels.

In another embodiment, in an embodiment of the present invention, the vehicle camera device 10 adjusts the focal length directly in accordance with the speed of the vehicle 20.

Figure 7:
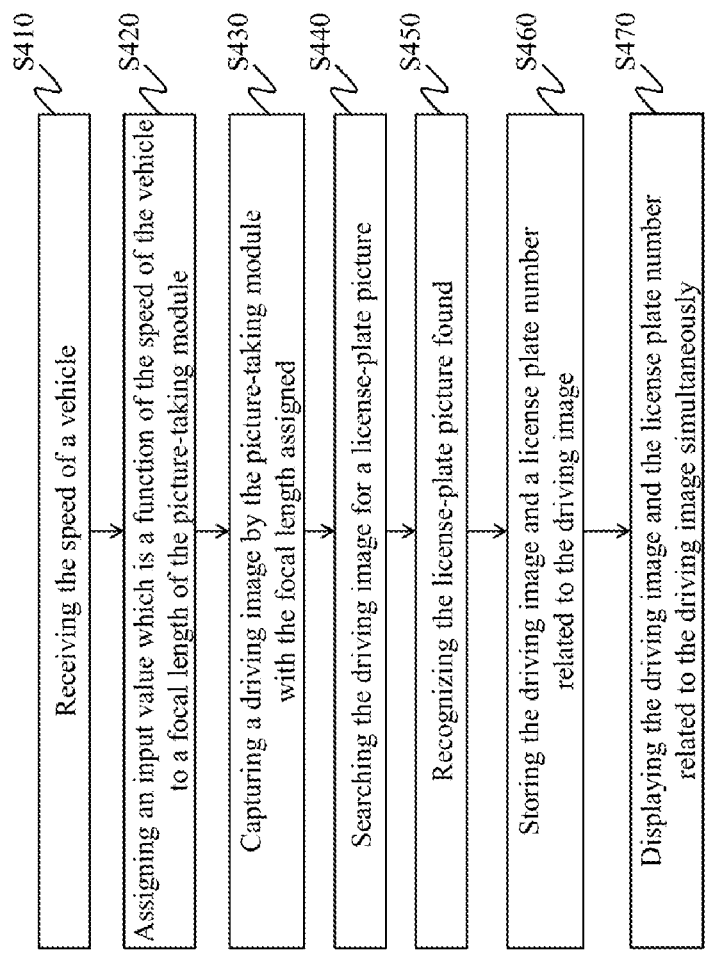
FIG. 7 is a flowchart of a method for recognizing a license plate with a vehicle camera device according to the fifth embodiment of the present invention.

Referring to FIGS. 1, 2 and 7, the adjusting unit 130 receives the speed of the vehicle 20 (step S410) and assigns an input value which is a function of the speed of the vehicle to the focal length of the picture-taking module 110 (step S420). Afterward, the picture-taking module 110 captures a driving image with the assigned focal length (step S430). The image analyzing unit 120 performs image recognition on the driving image to search the driving image for a license-plate picture (step S440) and recognizes the found license-plate picture so as to identify a license plate number displayed in the license-plate picture (step S450).

In some embodiments, the image analyzing unit 120 stores the driving image and the license plate number related to the driving image in the storing unit 150 (step S460).

In some embodiments, after the license plate number has been identified (step S450), the displaying unit 160 simultaneously displays the current driving image and the license plate number related to the current driving image (step S470). In some embodiments of step S470, the image analyzing unit 120 composites a composite image by combining the license plate number and the driving image, and then the displaying unit 160 displays the composite image which comprises the driving image and the license plate number.

Figure 8:
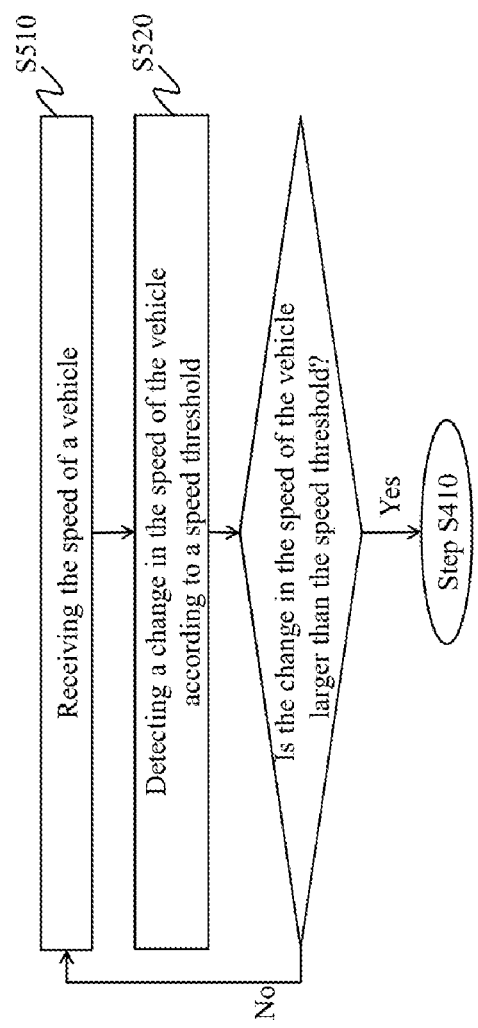
FIG. 8 is a partial flowchart of a method for recognizing a license plate with a vehicle camera device according to the sixth embodiment of the present invention.

Referring to FIG. 8, in some embodiments, the determining unit 140 receives the speed of the vehicle 20 (step S510) and detects a change in the speed of the vehicle 20 according to a speed threshold (step S520). If the change in the speed of the vehicle 20 leads to a speed larger than the speed threshold, the determining unit 140 enables the adjusting unit 130 to adjust the focal length of the picture-taking module 110 (that is, go back to step S410). If the change in the speed of the vehicle 20 leads to a speed not larger than the speed threshold, the adjusting unit 130 does not adjust the focal length of the picture-taking module 110. In some embodiments, the speed threshold is assigned and stored in the storing unit 150 in advance.

It should be noted that although the steps are described sequentially, the sequence is not restrictive of the present invention. Persons skilled in the art understand that under a reasonable condition some steps can be executed simultaneously or in reverse order.

In some embodiments, the recognition technology applied in step S360 or step S362 or step S450 is well known among persons skilled in the art and thus is not described herein for the sake of brevity.

In some embodiments, the image analyzing unit 120, the adjusting unit 130 and the determining unit 140 are implemented by one or more processing components. The processing components are microprocessors, microcontrollers, digital signal processors, microcomputers or central processing units. The storing unit 150 is implemented by one or more storage elements. The storage elements are exemplified by memory or registers, but the present invention is not limited thereto.

In conclusion, a method for recognizing a license plate with a vehicle camera device and the vehicle camera device according to the present invention are adapted for use with a vehicle. The focal length of the vehicle camera device is adjusted in response to the speed of the vehicle to increase the recognition rate of a license-plate picture found in a driving image captured with the vehicle camera device.

What is claimed is:

1. A method for recognizing a license plate, the method comprising the steps of:
    capturing a first driving image by a picture-taking module of a vehicle camera device with a focal length of a first assigned value, wherein the vehicle camera device is mounted on a vehicle;
    performing image recognition on the first driving image to search the first driving image for a license-plate picture;
    detecting a picture size of the license-plate picture according to a size threshold;
    increasing the focal length from the first assigned value to a second assigned value according to a speed of said vehicle on which the vehicle camera device is mounted when the picture size of the license-plate picture is smaller than the size threshold; and
    capturing a second driving image by the picture-taking module with the focal length of the second assigned value.

2. The method of claim 1, further comprising the steps of:
    performing image recognition on the second driving image to search the second driving image for the license-plate picture;
    performing text recognition on the license-plate picture found in the second driving image so as to identify a license plate number; and
    storing the license plate number.

3. The method of claim 1, further comprising the step of performing text recognition on the license-plate picture found in the first driving image so as to identify a license plate number and record the license plate number when the picture size of the license-plate picture is larger than or equal to the size threshold.

4. The method of claim 1, wherein the first assigned value and the second assigned value are each an optical zoom multiple.

5. A vehicle camera device, adapted to be mounted disposed on a vehicle, the vehicle camera device comprising:
    a picture-taking module for capturing a driving image with a focal length;
    an image analyzing unit for performing image recognition on the driving image to search the driving image for a license-plate picture;
    an adjusting unit for receiving a speed of said vehicle on which the vehicle camera device is mounted; and a determining unit for detecting a picture size of the license-plate picture according to a size threshold and causing the adjusting unit to increase the focal length of the picture-taking module according to the speed of said vehicle on which the vehicle camera device is mounted when the picture size of the license-plate picture is smaller than the size threshold.

6. The vehicle camera device of claim 5, wherein the determining unit causes the image analyzing unit to perform text recognition on the license-plate picture so as to identify a license plate number, when the picture size of the license-plate picture is larger than or equal to the size threshold.

7. The vehicle camera device of claim 6, further comprising a displaying unit for simultaneously displaying the current driving image and the license plate number related to the driving image.

8. The vehicle camera device of claim 6, further comprising a storing unit for storing the driving image and the license plate number related to the driving image.

9. A method for recognizing a license plate, the method comprising the steps of:

receiving a speed of a vehicle on which a vehicle camera device mounted;

generating an assigned value of a picture-taking module of the vehicle camera device according to the speed of said vehicle on which the vehicle camera device is mounted;

assigning a focal length of the picture-taking module with the assigned value;

capturing a driving image by the picture-taking module with the focal length assigned;

searching the driving image for a license-plate picture; and recognizing the license-plate picture found.

* * * * *